United States Patent [19]

Ohta et al.

[11] 4,267,230

[45] May 12, 1981

[54] FILM FOR A MAGNETIC BUBBLE DOMAIN DEVICE

[75] Inventors: Norio Ohta; Fumihiko Ishida, both of Hachioji; Tadashi Ikeda, Kodaira; Keikichi Ando, Musashino; Yutaka Sugita, Tokorozawa, all of Japan

[73] Assignee: Hitachi, Ltd., Tokyo, Japan

[21] Appl. No.: 89,380

[22] Filed: Oct. 30, 1979

[30] Foreign Application Priority Data

Nov. 1, 1978 [JP] Japan ............................... 53/133713

[51] Int. Cl.$^3$ ................................................ G11B 5/64

[52] U.S. Cl. ................................ 428/336; 252/62.57; 365/33; 427/128; 428/900; 428/692

[58] Field of Search ..................... 252/62.57; 428/336, 428/539, 900; 365/33; 427/128

[56] References Cited

U.S. PATENT DOCUMENTS 3,665,427 5/1972 Bobeck et al. .................... 252/62.57

OTHER PUBLICATIONS

Moody et al., "IEEE Transaction on Magnetics", vol. 9, Mag-9, No. 3, Sep. 1973, pp. 377-381.

Sandfort et al., "AIP Conf. Proc." 18 (1), pp. 237-241, 1973.

Summer et al., "AIP Conf. Proc." 34, pp. 157-159, 1976.

*Primary Examiner*—Jack Cooper

*Attorney, Agent, or Firm*—Craig & Antonelli

[57] ABSTRACT

A garnet film for a magnetic bubble domain device which comprises a predetermined quantity of Gd and a predetermined quantity of Ga.

The garnet film has a temperature coefficient of not more than 0.2%/°C. in respect of the bubble collapse field owing to the addition of Gd and Ga and is suitable for substaining small magnetic bubbles of a diameter of less than 2.5 $\mu$m.

3 Claims, 1 Drawing Figure

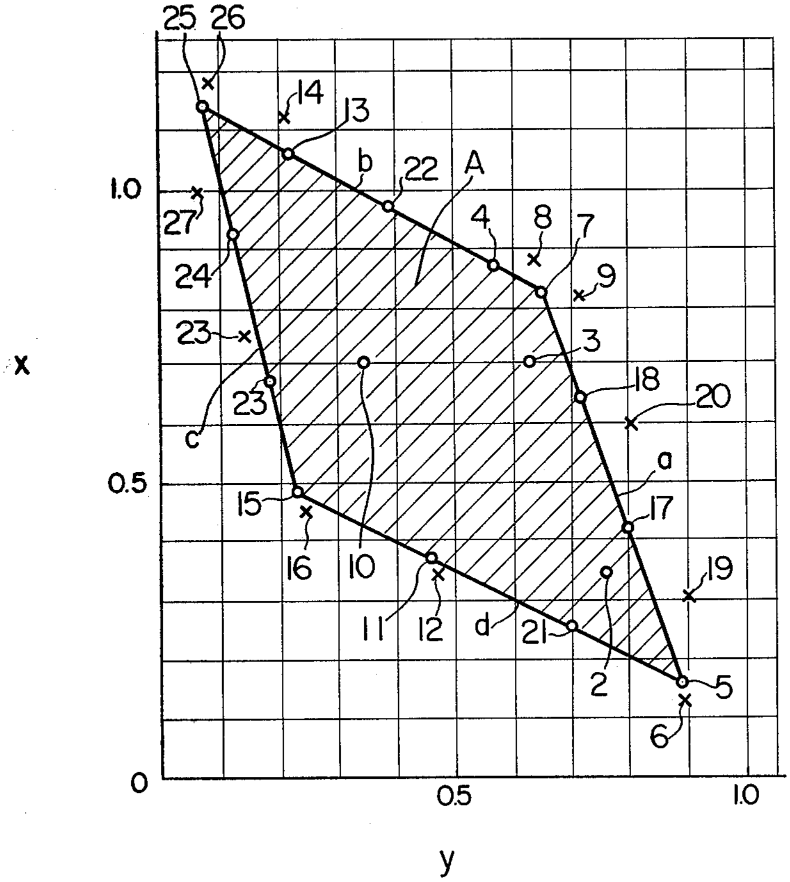
x
y
0
0.5
1.0
0.5
1.0
A
a
b
c
d
1
2
3
4
5
6
7
8
9
10
11
12
13
14
15
16
17
18
19
20
21
22
23
24
25
26
27

FILM FOR A MAGNETIC BUBBLE DOMAIN DEVICE

BACKGROUND OF THE INVENTION

1. Field of the Invention

This invention generally relates to magnetic bubble domain devices and more particularly to a garnet film having a uniaxial magnetic anisotropy for a magnetic bubble domain device being suitable for use as a film for sustaining magnetic bubbles.

2. Description of the Prior Art

As well known in the art, magnetic bubble domain devices have been highlighted as versatile information processing devices, especially memory devices, and active development has been directed thereto.

In applying magnetic bubble domain devices to memory devices, it is necessary to take into consideration the fact that the diameter (d) of a magnetic bubble determines the memory density which is the most important factor of memory function.

Today, the magnetic bubble having a diameter of 3 to 5 μm is practically used but it is expected that the memory density can be highly populated with a small magnetic bubble having a diameter of less than 2.5 μm.

In other words, in order that the magnetic bubble domain devices play the part of the other memory devices, such as disk memories and semiconductor memories, which are typically available at the present time and they are put into practice as memory devices, it is necessary to increase the memory density drastically by decreasing the diameter of the magnetic bubble to the order of less than 2.5 μm. Therefore, there is an ardent demand for advent of a garnet film in which magnetic bubbles of small diameter can exist stably and can propagate.

However, a garnet film for so-called small magnetic bubbles of a diameter of the order of less than 2.5 μm has, as experienced in the art, a bubble collapse field Ho which has great dependencies on temperatures.

For example, a $(YSmLu)_3(FeGa)_5O_{12}$ film capable of sustaining magnetic bubbles of a diameter of about 2 μm has a temperature variation rate or coefficient of −0.30 to −0.35%/°C. in respect of Ho at 30° C.

On the other hand, the bias field from a bias magnet usually made of barium ferrite has a temperature variation rate of −0.20%/°C., greatly differing from that of the bubble collapse field.

The great difference in temperature variation rate between Ho of the garnet film for sustaining the magnetic bubbles and the bias field narrows greatly the temperature range which permits stable movement of the magnetic bubbles, thus affecting the magnetic bubble domain device adversely.

Temperature characteristics of a garnet film for a magnet bubble domain device are discussed, for example, in the following references:

(1) "Temperature Variation of Magnetic Bubble Garnet Film Parameters" By R. M. Sandfort et al, AIP Conf. Proc. 18, (1), pp 237-241 (1973);

(2) "Growth Reproducibility and Temperature Dependencies of the Static Properties of YSmLuCaFeGe Garnet" by G. G. Sumner et al, AIP Conf. Proc. 34, pp 157-159 (1976); and (3) "Properties of $Gd_yY_{3-y}Fe_{5-x}Ga_xO_{12}$ Films Grown by LPE" by Jerry W. Meody et al, IEEE transactions on magnetics, Vol. Mag-9, p. 377 (1973).

Reference (1) describes temperature characteristics of a garnet film for magnetic bubbles but discloses neither the improvement in temperature characteristics of a garnet film for small magnetic bubbles in respect of Ho nor a composition of the present invention.

Reference (2) discloses a YSmLuCaFeGe garnet as a film material having a temperature coefficient of −0.2%/°C. in respect of Ho. This film is, however, of a Ca-Ge system garnet which is totally different from the composition of the present invention. In addition, Ho cannot be controllable so that it is impossible to determine the value of Ho which fairly matches with the bias field used.

A garnet film disclosed in reference (3) and containing Gd and Ga is totally different from the composition of the present invention because quantities of Gd and Ga are different from those of the present invention and Sm and Lu are excluded. In addition, this garnet film is unsuitable for small magnetic bubbles and Ho is not referred to in reference (3).

SUMMARY OF THE INVENTION

An object of this invention is to ensure the formation of a magnetic bubble domain device which can operate stably within a wide temperature variation range by solving the above problems encountered in the prior art garnet film for small magnetic bubbles.

Another object of this invention is to provide a garnet film for small magnetic bubbles having a temperature variation rate of not more than −0.2%/°C. in respect of Ho.

According to this invention, the above objects can be accomplished by providing a garnet film for a magnetic bubble domain device having a composition of $(YSmLu)_3(FeGa)_5O_{12}$ wherein a predetermined amount of Gd is added to the composition to reduce temperature variations in respect of Ho.

BRIEF DESCRIPTION OF THE DRAWING

A single FIGURE is a graphic representation to show a range for preferable quantities of Gd and Ga contained in a garnet single crystalline film according to this invention.

DESCRIPTION OF THE PREFERRED EMBODIMENT

As described above, the $(YSmLu)_3(FeGa)_5O_{12}$ film has a temperature variation rate of −0.30 to −0.35%/°C. in respect of Ho and the bias field from a barium ferrite magnet has a temperature variation rate of −0.20%/°C.

Accordingly, it is possible to form a magnetic bubble domain device which can operate stably within a wide temperature range by making the temperature variation rate of $(YSmLu)_3(FeGa)_5O_{12}$ in respect of Ho coincident with that of the bias field. Needless to say, it is also possible to obtain a magnetic bubble domain device which can be more stable against temperature variations by further reducing the temperature variation rate in respect of Ho along with corresponding reduction in the temperature variation rate of the bias field which may be attained by selecting the material of ferrite.

According to the invention, based on the fact that the temperature coefficient of the bubble collapse field Ho depends on temperature variations in the temperature coefficient of the saturation magnetization, rare earth element and iron are partly substituted by a predetermined quantity of Gd and Ga, respectively, to so adjust the temperature coefficient of the saturation magnetization as to make the temperature coefficient of bubble collapse field Ho range from −0.2 to 0%/°C. More particularly, in the present invention, the rare earth element, on the one hand, is partly substituted by Gd to reduce the temperature coefficient of the saturation magnetization on the ground of experimental results that Gd acts to reduce the temperature coefficient of the saturation magnetization and Fe which is responsible for increasing the temperature coefficient of the saturation magnetization, on the other hand, is substituted by Ga of non-magnetic element, so that the total saturation magnetization temperature coefficient can be reduced, thereby reducing the temperature coefficient of Ho considerably.

Since the temperature coefficient of Ho of more than −0.2 in absolute value adversely exceeds the temperature coefficient of the bias field and positive temperature coefficient of Ho is unpractical as causing excessive temperature dependencies of the magnetic bubble diameter, the temperature coefficient of Ho ranging from −0.2 to 0%/°C. is required.

Such requirements can be met by the present invention since, as described above, on the ground of experimental results that the substitution of Gd for a portion of the rare earth element can decrease the temperature coefficient of Ho, a proper quantity of Gd is added to decrease the temperature coefficient of the saturation magnetization and a proper quantity of Ga is added to reduce the influence of Fe, so that a garnet film for magnetic bubbles can be formed which sustains magnetic bubbles of small diameter and has a sufficiently small temperature coefficient ranging from −0.2 to 0%/°C.

The invention will be described in more detail by way of examples.

Table 1 shows characteristics of a garnet film having a composition generally termed $(YSmLu)_{3-x}Gd_x Fe_{5-y}Ga_yO_{12}$ when values of x and y are varied. In Table 1, good characteristics are indicated by "O" wherein small magnetic bubbles of less than 2.5 μm diameter can exist stably and the temperature coefficient of Ho can lie within the above-mentioned preferable range and bad characteristics in contrast to the good characteristics are indicated by "X".

Results according to Table 1 are illustrated in a single FIGURE in terms of parameters of x and y. In the FIGURE, characteristics are checked by using symbols "O" and "X" as in Table 1 and numerals labelled to each of the symbols "0" and "X" denote sample numbers which correspond to those in Table 1.

As will be seen from the FIGURE, with the quantity (x) of Gd and the quantity (y) of Ga lying in a region A surrounded by line segments a, b, c and d, small magnetic bubbles of less than 2.5 μm diameter can exist stably and the temperature coefficient of Ho can lie within the range of −0.2 to 0%/°C. whereas with x and y outside the region A, such advantageous characteristics cannot be obtained.

Specifically, for x and y lying in a region on the right-hand side of the line segment a, the magnetic bubble diameter exceeds 2.5 μm; for x and y lying in a region above the line segment b, the temperature variation coefficient of Ho becomes positive with the result that the temperature coefficient of the magnetic bubble diameter becomes excessive, exceeding the practical range; for x and y lying in a region on the lefthand side of the line segment c, the magnetic bubble diameter becomes too small to ensure detection and propagation of the magnetic bubble; and for x and y lying in a region beneath the line segment d, negative temperature coefficient of Ho becomes excessive in absolute value, disturbing coincidence of the temperature coefficient of Ho with that of the bias field from the magnet.

TABLE 1

| Sample No. | Composition | x | y | Bubble Diameter d(μm) | Film thickness h(μm) | Collapse field Ho(Oe) | Temperature variation rate of Ho (%/°C.) | Indication of characteristics |
|---|---|---|---|---|---|---|---|---|
| 1 | $(Y_{1.82}Sm_{0.67}Lu_{0.51})(Fe_{4.12}Ga_{0.88})O_{12}$ | 0 | 0.88 | 1.8 | 1.9 | 195 | −0.32 | x |
| 2 | $(Y_{1.30}Sm_{0.45}Lu_{0.90}Gd_{0.35})(Fe_{3.25}Ga_{0.75})O_{12}$ | 0.35 | 0.75 | 1.8 | 1.7 | 195 | −0.17 | o |
| 3 | $(Y_{0.60}Sm_{0.50}Lu_{1.20}Gd_{0.70})(Fe_{4.37}Ga_{0.63})O_{12}$ | 0.70 | 0.63 | 2.0 | 2.2 | 225 | −0.05 | o |
| 4 | $(Y_{0.42}Sm_{0.40}Lu_{1.30}Gd_{0.88})(Fe_{4.42}Ga_{0.58})O_{12}$ | 0.88 | 0.58 | 1.9 | 1.8 | 232 | −0.00 | o |
| 5 | $(Y_{1.59}Sm_{0.55}Lu_{0.70}Gd_{0.16})(Fe_{4.10}Ga_{0.90})O_{12}$ | 0.16 | 0.90 | 2.5 | 2.4 | 152 | −0.20 | o |
| 6 | $(Y_{1.59}Sm_{0.54}Lu_{0.72}Gd_{0.12})(Fe_{4.09}Ga_{0.91})O_{12}$ | 0.12 | 0.91 | 2.4 | 2.2 | 148 | −0.27 | x |
| 7 | $(Y_{0.95}Sm_{0.30}Lu_{0.90}Gd_{0.85})(Fe_{4.35}Ga_{0.65})O_{12}$ | 0.85 | 0.65 | 2.5 | 2.6 | 165 | −0.00 | o |
| 8 | $(Y_{1.00}Sm_{0.25}Lu_{0.85}Gd_{0.90})(Fe_{4.36}Ga_{0.64})O_{12}$ | 0.90 | 0.64 | 2.5 | 2.4 | 168 | +0.08 | x |
| 9 | $(Y_{1.27}Sm_{0.20}Lu_{0.70}Gd_{2.83})(Fe_{4.30}Ga_{0.70})O_{12}$ | 2.82 | 0.70 | 3.2 | 3.8 | 140 | +0.07 | x |
| 10 | $(Y_{0.40}Sm_{0.70}Lu_{1.2}Gd_{0.70})(Fe_{4.64}Ga_{0.36})O_{12}$ | 0.70 | 0.36 | 0.9 | 1.0 | 410 | −0.13 | o |
| 11 | $(Y_{0.22}Sm_{0.85}Lu_{1.55}Gd_{0.38})(Fe_{4.53}Ga_{0.47})O_{12}$ | 0.38 | 0.47 | 1.0 | 0.9 | 382 | −0.20 | o |
| 12 | $(Y_{0.33}Sm_{0.85}Lu_{1.48}Gd_{0.34})(Fe_{4.52}Ga_{0.48})O_{12}$ | 0.34 | 0.48 | 1.0 | 1.0 | 377 | −0.26 | x |
| 13 | $(Y_{0.06}Sm_{0.65}Lu_{1.22}Gd_{1.07})(Fe_{4.77}Ga_{0.23})O_{12}$ | 1.07 | 0.23 | 1.0 | 1.1 | 431 | −0.00 | o |
| 14 | $(Y_{0.01}Sm_{0.65}Lu_{1.24}Gd_{1.10})(Fe_{4.78}Ga_{0.22})O_{12}$ | 1.10 | 0.22 | 0.9 | 0.8 | 443 | +0.08 | x |
| 15 | $(Y_{0.37}Sm_{0.90}Lu_{1.25}Gd_{0.48})(Fe_{4.75}Ga_{0.25})O_{12}$ | 0.48 | 0.25 | 0.7 | 0.6 | 556 | −0.20 | o |

TABLE 1-continued

| Sample No. | Composition | x | y | Bubble Diameter d(μm) | Film thickness h(μm) | Collapse field Ho(Oe) | Temperature variation rate of Ho (%/°C.) | Indication of characteristics |
|---|---|---|---|---|---|---|---|---|
| 16 | $(Y_{0.37}Sm_{0.92}Lu_{1.26}Gd_{0.45})(Fe_{4.75}Ga_{0.25})O_{12}$ | 0.45 | 0.25 | 0.7 | 0.7 | 581 | −0.26 | x |
| 17 | $(Y_{1.30}Sm_{0.50}Lu_{0.80}Gd_{0.40})(Fe_{4.19}Ga_{0.81})O_{12}$ | 0.40 | 0.81 | 2.5 | 2.4 | 158 | −0.15 | o |
| 18 | $(Y_{1.20}Sm_{0.40}Lu_{0.75}Gd_{0.65})(Fe_{4.28}Ga_{0.72})O_{12}$ | 0.65 | 0.72 | 2.4 | 2.3 | 162 | −0.08 | o |
| 19 | $(Y_{1.95}Sm_{0.25}Lu_{0.50}Gd_{0.30})(Fe_{4.10}Ga_{0.90})O_{12}$ | 0.30 | 0.90 | 3.8 | 4.1 | 126 | −0.18 | x |
| 20 | $(Y_{1.20}Sm_{0.40}Lu_{0.80}Gd_{0.60})(Fe_{4.20}Ga_{0.80})O_{12}$ | 0.60 | 0.80 | 3.2 | 3.4 | 116 | −0.10 | x |
| 21 | $(Y_{1.05}Sm_{0.65}Lu_{1.05}Gd_{0.25})(Fe_{4.30}Ga_{0.70})O_{12}$ | 0.25 | 0.70 | 1.5 | 1.6 | 312 | −0.20 | o |
| 22 | $(Y_{0.42}Sm_{0.65}Lu_{0.95}Gd_{0.98})(Fe_{5.60}Ga_{0.40})O_{12}$ | 0.98 | 0.40 | 1.3 | 1.4 | 356 | −0.00 | o |
| 23 | $(Y_{0.12}Sm_{1.00}Lu_{1.20}Gd_{0.68})(Fe_{4.80}Ga_{0.20})O_{12}$ | 0.68 | 0.20 | 0.7 | 0.8 | 595 | −0.17 | o |
| 24 | $(Y_{0.07}Sm_{0.90}Lu_{1.10}Gd_{0.93})(Fe_{4.86}Ga_{0.14})O_{12}$ | 0.93 | 0.14 | 0.8 | 0.9 | 618 | −0.05 | o |
| 25 | $(Y_{0.04}Sm_{0.82}Lu_{1.00}Gd_{1.14})(Fe_{4.91}Ga_{0.09})O_{12}$ | 1.14 | 0.09 | 0.7 | 0.7 | 570 | −0.00 | o |
| 26 | $(Y_{0.08}Sm_{0.75}Lu_{1.00}Gd_{1.17})(Fe_{4.90}Ga_{0.10})O_{12}$ | 1.17 | 0.10 | 0.8 | 0.9 | 563 | +0.05 | x |
| 27 | $(Y_{0.05}Sm_{0.90}Lu_{1.05}Gd_{1.00})(Fe_{4.91}Ga_{0.09})O_{12}$ | 1.00 | 0.09 | <0.7 | 0.6 | — | — | x |
| 28 | $(Y_{0.10}Sm_{1.05}Lu_{1.20}Gd_{0.65})(Fe_{4.85}Ga_{0.15})O_{12}$ | 0.65 | 0.15 | <0.7 | 0.7 | — | — | x |

As having been described, the invention provides the excellent garnet film which permits small magnetic bubbles of less than 2.5 μm diameter to exist stably and has the sufficiently small temperature coefficient in respect of Ho.

The garnet film of the invention can be prepared through ordinary liquid phase epitaxial growth process by using a $Gd_3Ga_5O_{12}$ (G.G.G.) single crystalline substrate as exemplified below.

A predetermined amount of fresh material of oxide is put into a platinum crucible and heated at 1200° C. for 20 hours to be molten uniformly. The temperature is then lowered at a rate of 50 to 100° C./h to a value which exceeds a saturation temperature Ts (about 920° C.) by 10° to 20° C.

After the melt is stirred by a platinum stirrer at a rate of 200 rpm for 30 minutes, the temperature is further lowered to a value which is 5° to 30° C. below the saturation temperature Ts and maintained at this temperature for 30 minutes to stabilize the melt.

Thereafter, the G.G.G. substrate is hung about 1 cm above the surface of the melt and preheated for about 15 minutes. The G.G.G. substrate is then dipped about 1 cm beneath the surface of the melt and rotated at 30 to 100 rpm for epitaxial growth.

After the growth of a desired thickness is observed, the substrate is pulled up from the melt and rotated at about 400 rpm for removal of surplus melt deposited on the substrate.

The thickness of the garnet film is dimensioned variously for use in the magnetic bubble domain device. Typically, the thickness is set to be as large as about ½ to 1 time the diameter d of the magnetic bubble.

With the garnet film of the invention, it is possible to create magnetic bubbles of very small diameter and sustain them stably. Further, the diameter of the magnetic bubble can be varied by varying the thickness of the garnet film.

The film thickness is 0.2 to 4.0 μm for use in the magnetic bubble domain device and most preferably, 0.3 to 1.2 μm.

We claim:

1. A garnet film on a substrate, for a magnetic bubble domain device, said garnet film having a composition $Y_aSm_bLu_cGd_xFe_{5-y}Ga_yO_{12}$, wherein with reference to a single FIGURE in the accompanying drawing, values of x and y lie in a region A surrounded by a line segment a connecting a point 5 (0.90, 0.16) and a point 7 (0.65, 0.85), a line segment b connecting the point 7 (0.65, 0.85) and a point 25 (0.09, 1.14), a line segment c connecting the point 25 (0.09, 1.14) and a point 15 (0.25, 0.48), and a line segment d connecting the point 15 (0.25, 0.48) and the point 5 (0.90, 0.16), a+b+c+x=3, and a is from 0.04 to 1.59, b is from 0.30 to 1.00, and c is from 0.70 to 1.55, said substrate being a $Gd_3Ga_5O_{12}$ single crystalline substrate, and said garnet film being an epitaxially grown film.

2. A garnet film on a substrate according to claim 4 wherein said film has a thickness of 0.2 to 4 μm.

3. A garnet film on a substrate according to claim 2, wherein said film has a thickness of 0.3 to 1.2 μm.

* * * * *